US010308520B2

(12) United States Patent
Ray et al.

(10) Patent No.: US 10,308,520 B2
(45) Date of Patent: Jun. 4, 2019

(54) REACTOR AND METHOD FOR MAKING BROMIDES

(71) Applicant: LANXESS SOLUTIONS US, INC., Middlebury, CT (US)

(72) Inventors: Thomas G. Ray, El Dorado, AR (US); David W. Bartley, El Dorado, AR (US); Hugh Broadhurst, Cary, NC (US); Nate Goodwin, Whitestown, IN (US)

(73) Assignee: LANXESS Solutions US Inc., Shelton, CT (US)

( * ) Notice: Subject to any disclaimer, the term of this patent is extended or adjusted under 35 U.S.C. 154(b) by 71 days.

(21) Appl. No.: 15/598,011

(22) Filed: May 17, 2017

(65) Prior Publication Data

US 2017/0283272 A1   Oct. 5, 2017

Related U.S. Application Data

(62) Division of application No. 14/538,838, filed on Nov. 12, 2014, now Pat. No. 9,688,543.
(Continued)

(51) Int. Cl.
*B01J 19/24* (2006.01)
*C01F 11/34* (2006.01)
(Continued)

(52) U.S. Cl.
CPC .......... *C01F 11/34* (2013.01); *B01J 19/006* (2013.01); *B01J 19/0033* (2013.01);
(Continued)

(58) Field of Classification Search
CPC ............ B01J 19/0033; B01J 19/2455; B01J 19/2465; B01J 2219/00087;
(Continued)

(56) References Cited

U.S. PATENT DOCUMENTS 1,863,375 A   6/1932  Jones
2,007,758 A   7/1935  Harlow et al.
(Continued)

FOREIGN PATENT DOCUMENTS

CN   102099396 A   6/2011
EP   0338147 A1   10/1989
(Continued)

OTHER PUBLICATIONS

Ling et al., "Scale-up of enzymatic production of lactobionic acid using the rotary jet head system", Biotechnology and Bioengineering, vol. 97, No. 4, Jul. 1, 2007, pp. 842-849.
(Continued)

*Primary Examiner* — Lessanework Seifu

(57) ABSTRACT

Bromine containing compounds, such as calcium bromide, sodium bromide and the like, are prepared in high purity and more quickly with less waste by using a process with two bromination stages and often a third step wherein the crude product mixture can be adjusted to meet specific product requirements. In the first bromination stage, the majority, but not all, of a substrate is brominated using a reductive bromination reaction, the remaining unreacted substrate is converted to product in the second stage through another a reductive bromination reaction, although the specific reagents may be different, wherein the addition of bromine and a reducing agent are carefully monitored.

14 Claims, 2 Drawing Sheets

Related U.S. Application Data

(60) Provisional application No. 61/963,531, filed on Dec. 9, 2013.

(51) Int. Cl.
  *B01J 19/00*   (2006.01)
  *C01B 9/04*    (2006.01)
  *C01D 3/10*    (2006.01)
  *C01D 15/04*   (2006.01)
  *C01F 5/36*    (2006.01)

(52) U.S. Cl.
  CPC ............ *B01J 19/2455* (2013.01); *C01B 9/04* (2013.01); *C01D 3/10* (2013.01); *C01D 15/04* (2013.01); *C01F 5/36* (2013.01); *B01J 2219/00087* (2013.01); *B01J 2219/00164* (2013.01); *B01J 2219/00177* (2013.01); *B01J 2219/00772* (2013.01)

(58) Field of Classification Search
  CPC .... B01J 2219/00177; B01J 2219/00164; B01J 2219/00193; B01J 2219/00195; B01J 2219/00213; B01J 2219/0029
  See application file for complete search history.

(56) References Cited

U.S. PATENT DOCUMENTS

| | | |
|---|---|---|
| 2,269,733 A | 1/1942 | Pearson |
| 3,702,234 A | 11/1972 | Pavia |
| 4,083,942 A | 4/1978 | Sanders |
| 4,234,556 A | 11/1980 | del Valle |
| 4,248,850 A | 2/1981 | Keblys |
| 4,514,374 A | 4/1985 | Kirsch |
| 4,549,973 A | 10/1985 | Kirsch |
| 5,227,010 A * | 7/1993 | Lubert ............ C23F 1/46 156/345.18 |
| 5,230,879 A | 7/1993 | Beaver |
| 6,036,937 A | 3/2000 | Dunaway et al. |
| 6,117,408 A | 9/2000 | Howard et al. |
| 7,087,209 B2 | 8/2006 | Symens et al. |
| 2010/0074836 A1 * | 3/2010 | Brix ............ C01B 7/14 423/500 |

FOREIGN PATENT DOCUMENTS

| | | |
|---|---|---|
| EP | 1329259 A2 | 7/2003 |
| EP | 2457990 A1 | 5/2012 |
| GB | 285915 A | 9/1928 |
| WO | 2009/152403 A1 | 12/2009 |

OTHER PUBLICATIONS

Extended European Search Report dated Aug. 17, 2017 from corresponding EP Application No. 17166104.4, 10 pages.

PCT International Search Report and Written Opinion dated May 11, 2015 from corresponding Application No. PCT/US2014/066497, 14 pages.

PCT International Preliminary Report on Patentability dated Jun. 14, 2016 from corresponding Application No. PCT/US2014/066497, 9 pages.

Chinese Office Action dated May 4, 2017 by SIPO in corresponding CN Application No. 201480067036.X, along with unofficial English translation, 16 pages.

\* cited by examiner

REACTOR AND METHOD FOR MAKING BROMIDES

Disclosed is a process for preparing brominated materials, e.g., metal bromide salts, directly from bromine with near stoic conversion of all raw materials. The process allows for higher production rates in smaller equipment, reduces raw material and energy costs and is readily run as a continuous process.

BACKGROUND OF THE INVENTION

Metal bromides, such as sodium bromide, potassium bromide, magnesium bromide, and calcium bromide etc., are important commercial materials. New uses for even the oldest of these compounds are being introduced and demand for them continues to grow. For example, the use of salts such as sodium bromide and calcium bromide in the removal of mercury from the flue gas of coal burning power plants is growing at a rapid pace. While the preparation of many bromine containing compounds such as metal salts is conceptually simple, there are significant challenges in developing new and more efficient industrial processes for their preparation that use less energy, produce less waste, provide cleaner products, reduce costs, etc.

The preparation of metallic bromides by reaction of an alkali or alkaline earth metal compound (e.g. a compound of sodium, potassium, calcium, and the like) with bromine in the presence of a reducing agent (e.g., urea, cyanamide, ammonium carbonate, ammonium bicarbonate, formamide, carbamates, ammonium cyanide and formic acid, oxalic acid, and their salts) has long been known. Essentially the process involves fast reaction between the reducing agent and bromine producing HBr, which then reacts with the alkali or alkaline earth metal compound.

British specification No. 285,915 discloses the preparation of calcium bromide by reacting a "non-acid" calcium compound (e.g. calcium oxide, hydroxide, and/or carbonate) with bromine in the presence of a reducing agent which is converted to gas and/or water. The reducing agent insures that substantially no bromates or hypobromites are formed as by-products. This patent describes several reaction sequences, among which are addition of the metal salt to a reaction medium comprising reducing agent, bromine, and water (Example I); addition of an aqueous solution of metal salt and reducing agent to an aqueous bromine reaction medium (Example II); and addition of bromine to a reaction medium comprising the metal salt, reducing agent, and water (Example (III).

U.S. Pat. Nos. 1,863,375 and 2,007,758 disclose a process for preparing metal bromides employing ammonia to retard the formation of bromate and hypobromite. The U.S. Pat. No. 1,863,375 discloses the recirculation of an aqueous ammonia containing metal salt solution through a tower absorber in which it is exposed to bromine vapor. U.S. Pat. No. 2,007,758, relates to the same general process, but is specifically concerned with means for recovering the spent ammonia evolved from the reaction mixture.

U.S. Pat. No. 2,269,733 discloses the reaction of an alkali or alkaline earth metal compound with bromine in the presence of one of a variety of reducing agents. Several alternative reaction sequences are described including the simultaneous addition of bromine and metal salt to a mother liquor, with an excess of reducing agent preferably being employed. Alternatively, a two-step process is disclosed in which ammonia and bromine are first reacted in the presence of mother liquor to form ammonium bromide, with the metal salt thereafter being added together with additional bromine.

U.S. Pat. No. 4,083,942 discloses a process wherein a mixture of metal salt and reducing agent in water is first prepared and to this mixture is added in a stepwise manner alternate portions of bromine and the metal salt. A wide variety of reducing agents useful in the above general process are disclosed in the art including, e.g., U.S. Pat. No. 4,248,850 which discloses ammonia, ammonium salts, formic acid, formate salts, formamide, and formaldehyde, and U.S. Pat. No. 4,514,374, which discloses the use of lower alcohols.

Variations of the above general process, including the preparation of other halides, e.g., chlorides, and the use of other metals, e.g., zinc, can be found in, e.g., U.S. Pat. Nos. 6,117,408, 6,036,937, and 7,087,209.

There is still a need for an improved bromide transfer process capable of forming bromine containing compounds that efficiently uses all reagents, creates less waste, uses less energy and provides high purity material.

SUMMARY OF THE INVENTION

An improved process is provided for the preparation of bromine containing compounds, such as metallic bromides, e.g., calcium bromide, sodium bromide and the like, which process produces high purity product more quickly with less waste than processes currently available in the art. Broadly, the process of the invention comprises two bromination stages and often a third step wherein the crude product mixture can be adjusted to meet specific product requirements. In the first bromination stage, the majority, but not all, of a substrate is brominated using known reductive bromination reactions. The remaining unreacted substrate is converted to product in the second stage through another a reductive bromination reaction, although the specific reagents may be different, wherein the addition of bromine and a reducing agent are carefully monitored.

The process can be run as a batch, semi-continuous or continuous process, but is generally most efficient when run as a continuous process.

In one embodiment, the process is a continuous process wherein one or both of the bromination stages are run in a loop reactor. In one particular embodiment of the invention, the second stage bromination is run under automated dual cascade control, wherein the feed rate of bromine is adjusted relative to the pH of the reaction mixture and the feed rate of the reducing agent is adjusted relative to the oxidation/reduction potential (ORP) mixture. Dual cascade control may be used whether the second stage bromination is run in a loop reactor or a kettle or other conventional reactor.

While the generic chemical reactions used in the process are known, the process in which the chemistry is manipulated provides faster and more efficient production of the desired product with high purity and reduced waste. The process of the invention allows one to readily design the reaction train and raw material feed controls to achieve near stoic conversion on all raw materials.

DESCRIPTION OF THE INVENTION

Figure 1:
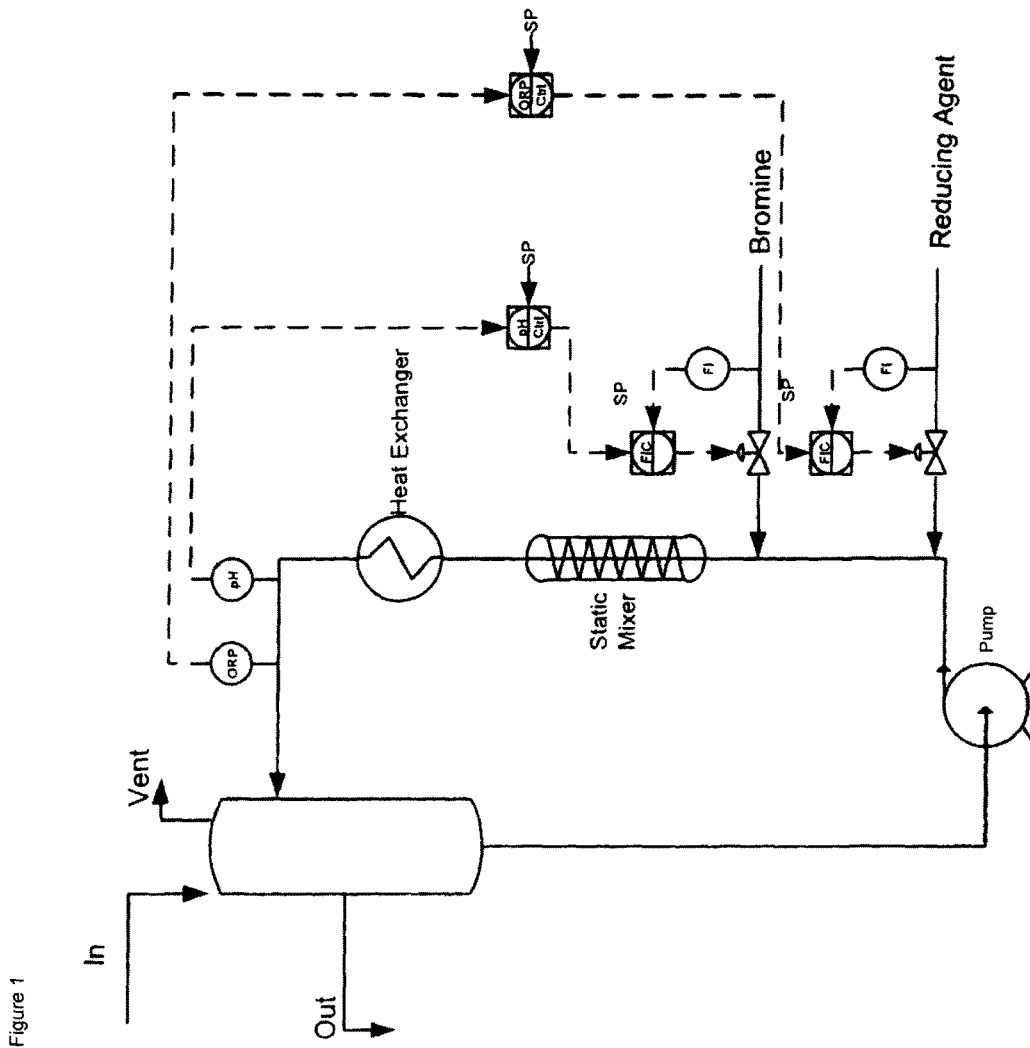
FIG. 1 is a schematic diagram of a loop reactor illustrating dual cascade control useful in the present process, especially in the stage 2 bromination.

In the process, a substrate of general formula $R_pX_m$ is converted to a compound $RBr_n$, wherein R in either formula is a metallic group such as an alkali or alkali earth metal, X is a group being replaced by bromine, and n, m and p are numbers which vary depending on the valances of R and X. Generally, the process comprises:

I) a first stage wherein a mixture comprising a first reducing agent and a substrate of formula $R_pX_m$, wherein:
  R is an alkali or alkali earth metal, e.g., Li, Na, K, Mg, Ca etc.,
  m is a number 1 or 2;
  p is a number 1 or 2; and
  X is oxygen atom, carbonate, bicarbonate or OH;
is reacted with an amount of $Br_2$ less than that required for 100% conversion of $RX_m$ to $RBr_n$ to provide an intermediate mixture comprising the product $RBr_n$ and residual substrate $RX_m$, and II) a second stage wherein a second reducing agent, which may be the same as or different from the first reducing agent, and an amount of bromine needed to provide 100% conversion of residual substrate $RX_m$ are separately added to the intermediate mixture forming a reaction product mixture, wherein addition of the second reducing agent and bromine are controlled in a manner that maintains or continuously re-establishes the pH and/or ORP of the reaction mixture within predetermined ranges.

Typically, the process includes a third stage wherein the final pH or concentration is adjusted. Steps to isolate or purify the product may also be optionally employed.

The process is conveniently used to prepare inorganic bromides such as LiBr, NaBr, KBr, $MgBr_2$, $CaBr_2$ and the like from corresponding metal compounds such as metal hydroxides, oxides, carbonates etc.

For example, in select embodiments, R of formula $RBr_n$ and $R_pX_m$ is selected from the group consisting of Li, Na, K, Mg and Ca, for example, R is Li, Na, K or Ca, and in many embodiments, X in the formula $R_pX_m$ is an oxygen atom or OH, i.e., the substrate of formula $R_pX_m$ is a metal oxide or hydroxide.

The first and second stages of the invention both use reductive bromination reactions wherein HBr is generated in situ by reduction of $Br_2$ by the selected reducing agent, and the HBr thus generated reacts with the substrate to transfer bromide. More than two bromination stages, including the use of alternate bromination chemistries, may be used but are not generally employed.

Typically, in stage 1, the $Br_2$ is added to a mixture of first reducing agent and a substrate of formula $R_pX_m$. The amount of reducing agent used in stage 1 is approximately equal to that required to reduce the added bromine to HBr or slightly less. Given the exothermic nature of the reaction of $Br_2$ and reducing agent to form HBr, the bromine is most often added at a rate which will produce and maintain the desired reaction temperature which is generally above room temperature, i.e., 35° C. or higher, 40° C. or higher, 45° C. or higher, 50° C. or higher, 55° C. or higher and in some embodiments the reaction temperature may exceed 60° C. Due to the volatile nature of some of the reactants, e.g., $Br_2$, stage 1 reaction that are run at higher temperatures, e.g., higher than 55° C., can be run under increased pressure, i.e., pressures above standard atmospheric pressure, in order to keep the reactants in a condensed state.

Most often a carrier or solvent will be present during the first and/or second stage of the process, as well as in many of the optional stages that may be employed. In many cases water is conveniently used carrier or solvent.

Various reducing agents useful for forming HBr from $Br_2$ are known, including, but not limited to ammonia, ammonium salts, formamide, formaldehyde, urea, cyanamide, carbamates, hydrazine and hydrazine derivatives, formic acid, oxalic acid and their salts etc. Any of these and many other known reducing agents may be used in the present process. Ammonia, ammonium salts, formamide, formaldehyde, urea, cyanamide, carbamates, hydrazine and hydrazine derivatives are well suited for the process. Ammonia, ammonium salts hydrazine and its derivatives are conveniently used in the process, especially when water is used as a carrier or solvent, or a portion of the carrier or solvent. In water of course, ammonia may exist as a mixture of ammonia and ammonia hydroxide. Ammonia and derivatives are also readily handled in a chemical plant and are inexpensive.

In stage 1, less than one equivalent of the bromine necessary for full conversion of the substrate to the desired brominated is added to a mixture of the substrate and reducing agent. Typically, an amount of $Br_2$ necessary to brominate the majority of the substrate is added in stage 1, e.g., more than 50%, e.g., from about 70%, to about 98%, but a portion of the substrate is not converted to bromide until the second stage. Any non-reduced $Br_2$ remaining in the reaction mixture at the end of stage 1 is reduced during stage 2.

Thus, the majority, but not all of the substrate is brominated in the first stage, e.g., 70%, 80% 85% 90% or more and up to about 99%, or 98% of the substrate is brominated in the first stage. When using two or more reducing agents, such as ammonia and hydrazine, the economics of the process can be improved by using a relatively inexpensive material, e.g., ammonia, as the first reducing agent where the majority of the substrate is brominated and using hydrazine as the second reducing agent where less reagent is required. Other reasons for using different reducing agents in stages 1 and 2 are demonstrated in some of the specific embodiments below.

In the second stage, the second reducing agent and the remainder of the $Br_2$ required for full conversion of the substrate are added separately in a controlled manner using a means for assuring that specific conditions are continuously maintained or re-established during the remaining reaction.

"Added separately", means that these two reagents are added through different feeds. They can be added simultaneously or a dose of one could be added alone and then a dose of the other could be added in an alternating manner until the reaction is done.

Adding the reagents in a "controlled manner using a means for assuring that specific conditions are continuously maintained or re-established during the remaining reaction" means that the rates and amounts added are adjustable and can be varied so that specific conditions within the reaction mixture remain consistent with those identified as beneficial for the desired reaction. Excellent results are obtained in stage 2 of the process when the pH and the oxidation reduction potential, i.e., ORP, of the reaction mixture remain or are continuously re-established within defined ranges. In many embodiments for example, stage 2 is controlled by continuously monitoring the pH and ORP of the reaction and adjusting the rates of addition for the reducing agent and/or bromine to keep these variables within a well-defined range.

As discussed in more detail below, careful control of the Stage 2 bromination provides several desirable results. For example, a limited amount of unwanted byproducts can be formed in stage 1, which byproducts can be converted to more desirable species at low pH and in many embodiments, the pH of the stage 2 reaction is held a pH of less than 2 or less than 1. Also, reduction of $Br_2$ will not occur outside specific ORP ranges leading to additional byproducts. Careful control of these two factors will limit the amount of byproducts produced in stage two, reduce the byproducts already formed in stage 1, and prevent the use of excess raw materials.

Such controls may also be used during stage 1, but the pH of stage 1 need not be run at the low pH used in stage 2 and sufficient control of the reaction in stage 1 is often achieved by adding the correct reagent mass at a rate that provides the desired reaction temperature. It is often wise however to monitor the ORP of the stage 1 reaction to ensure rapid reaction of $Br_2$ to HBr.

Either or both of the $Br_2$ and reducing agent feed can be controlled in this manner, typically both. For example, the $Br_2$ feed can be adjusted depending on the pH and/or ORP data while the reducing agent rate of addition remains constant or is determined based on other factors; the reducing agent feed can be adjusted depending on the pH and/or ORP data while the $Br_2$ rate of addition remains constant or is determined based on other factors; or the $Br_2$ feed and the reducing agent feed are each controlled by the pH and/or ORP data.

In one embodiment therefore, when the pH and/or ORP of the reaction mixture is outside of predetermined ranges the addition of $Br_2$ is increased, suspended or slowed until the predetermined pH and/or ORP ranges are re-established. For example, when the pH of the reaction mixture is outside of a predetermined range the addition of $Br_2$ is increased, suspended or slowed until the predetermined pH range is re-established.

In another embodiment when the pH and/or ORP of the reaction mixture is outside of predetermined ranges the addition of the second reducing agent is increased, suspended or slowed until the predetermined pH and/or ORP ranges are re-established. For example, when the ORP of the reaction mixture is outside of a predetermined range the addition of the second reducing agent is increased, suspended or slowed until the predetermined ORP range is re-established.

One excellent means for controlling the stage 2 reagent additions in a manner that insures smooth conversion of essentially all reaction components with limited amounts of unwanted byproducts is by dual cascade control of bromine and reducing agent based on pH and ORP measurements. This method can be automated, for example, as shown for a continuous loop reactor in FIG. 1. In this particular embodiment, the feed rate of bromine is continuously adjusted based on the difference between the desired pH value and the measured pH of the reaction mixture; while the feed rate of the reducing agent is continuously adjusted based on the difference between the desired ORP value and the measured ORP of the reaction mixture. This is conveniently done using an automated system designed to calculate the necessary feed rate adjustments through a continuous feedback loop using the measured pH and ORP values, the desired pH and ORP values and the existing feed rate set point, and then automatically reset the feed rate.

Of course, one may choose to manually adjust one or both of the reagent feeds. Also, one may choose to use a stirred reaction vessel rather than a loop reactor for either one or both of the stage 1 and stage 2 brominations.

Upon completion of stage 2, the pH of the product mixture is very acidic and typically needs to be adjusted. This can be accomplished in many standard ways, including adding lime slurry or material generated from stage 1 to the product mixture, as the stage 1 mixture has a higher pH. The concentration of the product mixture may also be adjusted, e.g., if $CaBr_2$ is intended for sale or use as a water solution, the product concentration can be controlled by careful selection of the amounts of water vs starting substrate used in the process. Other standard means of adjusting the concentration of course are well within the scope of the practitioner's skill.

Likewise, standard isolation and further purification techniques may be employed as desired.

Certain aspects of the invention are further illustrated by one particular embodiment of the invention related to the conversion of $Ca(OH)_2$, i.e., hydrated lime, to calcium bromide using ammonia as the reducing agent in stage 1 and a different reducing agent, i.e., hydrazine, in stage 2. This reaction is conveniently run in water, starting with an initial aqueous slurry of lime into which a specific amount of ammonia gas, typically as neat ammonia, is added to generating a mixture of substrate and reducing agent to which the bromine is added.

In stage 1, HBr and $N_2$ are rapidly formed by reaction of $Br_2$ with ammonia. Ammonium bromide can also form in this reaction but can be controlled or reversed by a higher pH environment. The reaction sequence for $CaBr_2$ generation is thus:

3Br2+2NH3→6HBr+N2↑,  Reaction 1:

followed by

2HBr+Ca(OH)2→CaBr2+2H2O.  Reaction 2:

Stage 1 is typically run at elevated pressure which allows one to use higher temperatures without vaporization of bromine. As suggested above, the temperature is related to the rate of addition of $Br_2$ and the exotherm of HBr generation. Higher temperatures speed the kinetics of the reaction and reduce the viscosity of the reaction mixture.

Along with $CaBr_2$, some byproducts are likely to form in stage 1. For example, it is known that $Br_2$ can react with hydrated lime directly to form undesirable byproducts such as calcium bromate and calcium hypobromite. However, calcium bromate for example, can be converted to CaBr2 at low pH, i.e., pH<1, according to the reaction:

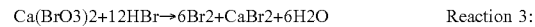
Ca(BrO3)2+12HBr→6Br2+CaBr2+6H2O  Reaction 3:

By running stage 2 of the process, at low pH, e.g., lower than pH 2, typically pH 1 or lower, one can convert any unwanted bromate salts generated in stage 1 to $Br_2$ and $CaBr_2$, and the regenerated $Br_2$ can re-enter the reactions of Reactions 1 and 2, to make maximum use of the reagent bromine. The pH can be lowered by adding HBr, however, it is far more desirable to generate the HBr by bromine reduction, as above. Unfortunately, while low pH conditions, e.g., conditions with excess HBr, will reduce the amount of $Ca(BrO_3)_2$, it will increase ammonium bromide formation which can cause processing issues. Also, if the concentration of HBr relative to reducing agent is too high, the oxidation/reduction potential of the reaction will no longer be in the desired range, suppressing the reduction of $Br_2$ to HBr leading to bromates formation via reaction between lime and $Br_2$. Care must be taken therefore to carefully control the amount of HBr present relative to both $Ca(OH)_2$ and reducing agent.

Further, stage 2 represents the final stages of the reaction where the final small amounts of starting $Ca(OH)_2$ are being converted to the desired product and where the concentrations of reactants become smaller, rates of reaction slow, adequate mixing may become more difficult etc. Such conditions, should they interfere with bromine reduction can result in the addition of excess reagents, inefficient use of starting materials, higher amounts of byproducts and lower product quality. This is especially problematic in large scale reactions as one must find an environmentally compatible way to dispose of waste, and of course the best way to do that is to not generate any, which requires efficient use and high conversion of all starting materials.

The invention provides both chemical and process solutions for the problems anticipated in stage 2. For example, given the need for quick, clean, efficient reactions at the latter portion of the process, a change in reducing agent may be desirable during stage 2. In this particular embodiment, the stage 2 reducing agent is hydrazine, which is a highly efficient and clean reagent for the reduction of bromine. Also, the continuous monitoring of pH and ORP, allow one to maintain the correct environment for clean product formation.

Thus, in stage 2, $Br_2$ and hydrazine are added to the reaction mixture prepared during stage 1. Hydrazine will react with both the newly added $Br_2$ and with any unreacted $Br_2$ left over from stage 1. HBr is quickly generated which will react to produce calcium bromide, and lower the pH of the mixture to induce the decomposition of unwanted bromates etc., according to, e.g., Reaction 3 above.

Stage 2 is run at a pH of less than 2, typically a pH of less than 1, and it has been found that keeping the pH of stage 2 near 0 works well in the present process. In most cases, the pH of stage 2 will be significantly lower than that of stage 1. Should the pH rise above the desired value, $Br_2$ addition can be increased to generate more HBr. Thus, the $Br_2$ feed rate in stage 2 can be controlled through the monitoring of pH.

However, in the aqueous reaction converting hydrated lime to $CaBr_2$, when ORP rises above, e.g., ~715 mV, bromine may no longer react with hydrazine to form HBr. Thus, one can also link the $Br_2$ feed addition feed to ORP measurements and stop or slow $Br_2$ addition at this point until appropriate reaction conditions are recreated. However, ORP measurements are more typically linked to hydrazine addition. For example, in this case the hydrazine feed is controlled to maintain for example, a OPR of about +640 mV.

Further process controls are illustrated by specific embodiments using one or more loop reactors. For example, when using the continuous loop reactor of FIG. 1 for the stage 2 bromination, the actual volume of material being subjected to bromine and hydrazine addition is limited by the volume of the reactor, which is designed for highly efficient mixing and temperature control, maximizing conversion and minimizing reaction time, and wherein the automatic feedback of the cascade control loops rigorously control reagent addition and reaction conditions.

A reactor system comprising the loop reactor of FIG. 1 is one embodiment of the invention, particularly wherein cascade control of the bromine feed is linked to the measured pH of the reaction and/or cascade control of the reducing agent feed, for example, hydrazine, is linked to the measured ORP of the reaction. Excellent results are achieved when both the pH and ORP cascades are employed.

Figure 2:
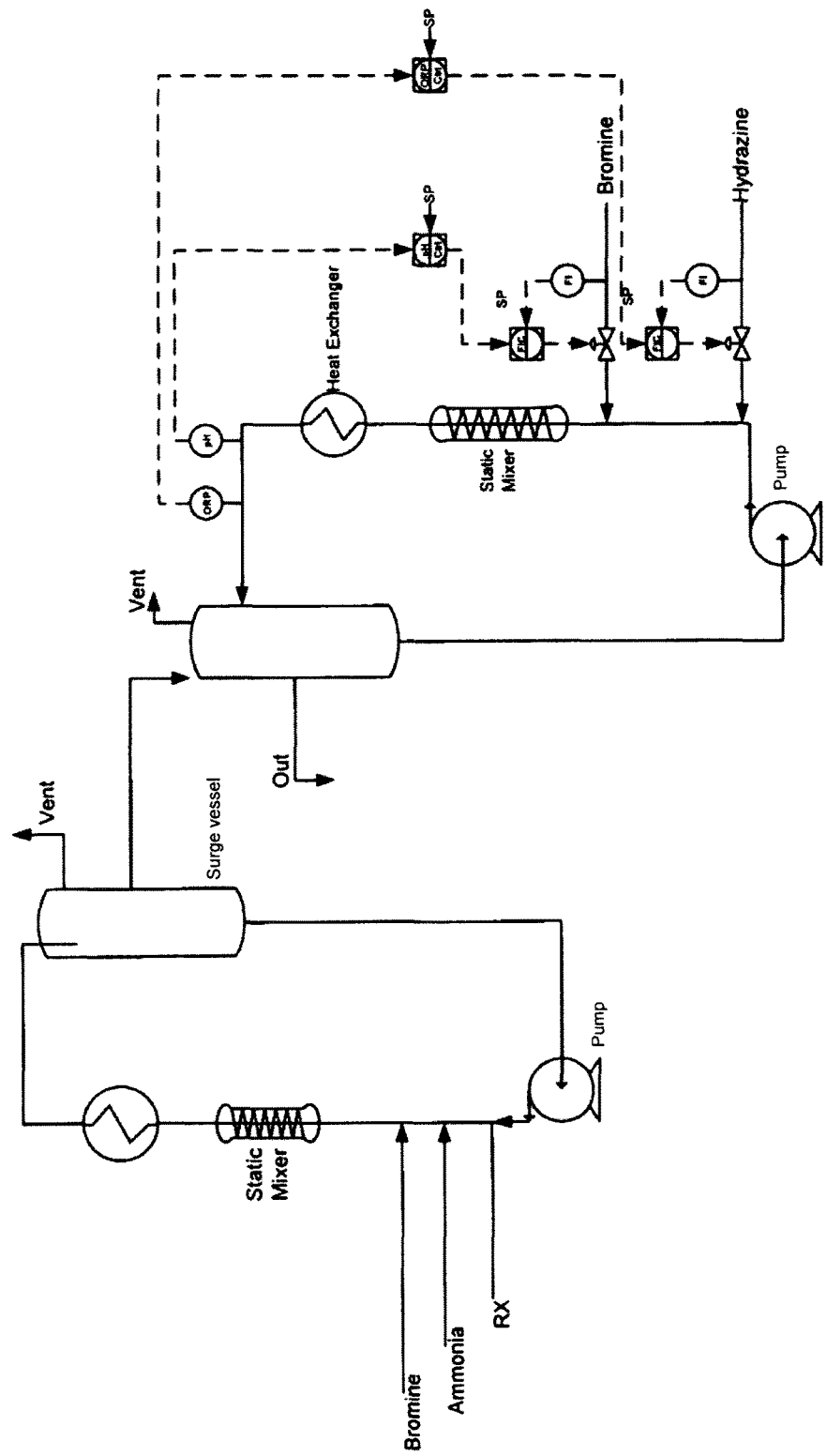
FIG. 2 is a schematic of a dual loop reactor useful in the invention illustrating a simplified loop reactor for stage 1 bromination and a dual cascade controlled loop reactor for stage 2 bromination.

Another embodiment relates to a reactor system comprising the loop reactor of FIG. 1 for stage 2 bromination and a separate loop reactor for stage 1, as illustrated e.g., in FIG. 2.

Another embodiment relates to any reactor setup comprising either or both of the cascade controls shown in FIG. 1. In operating these controls for, e.g., the lime to $CaBr_2$ conversion, the set points for initial bromine flow rate and selected pH are set at the startup of the reaction, as are the set points for initial hydrazine flow rate and ORP. As the product from stage 1 is fed into the loop and reacted with the hydrazine and bromine, the system measures the pH, and if the actual pH is not consistent with the pH set point, the flow rate is adjusted to bring the system into compliance. Likewise, the ORP is measured and the feed of hydrazine is adjusted if necessary. One particular embodiment relates to the loop reactor setup wherein these measurements and adjustments in feed rates occur within an automated continuous feedback cycle.

For example, one particular embodiment is to a continuous process using a dual loop reactor in stage 1 and stage 2, e.g., as shown in FIG. 2. For example, lime slurry (37.6% solids in water) is prepared and charged to the Lime Slurry storage tank and kept agitated to prevent it from settling. Lime slurry, bromine and ammonia gas are fed continuously at the appropriate stoichiometry to ensure 90% lime conversion into the Stage 1 Loop Reactor comprising a recirculation pump, static mixer, heat exchanger and surge vessel. The heat of reaction is significant and is removed by the heat exchanger with cooling tower water on the shell-side. Nitrogen is liberated in the reaction and is separated in the surge vessel and vented to the sodium hydroxide process scrubber. Alternate embodiments may use an agitated reactor for stage 1.

The reaction mixture from Stage 1 is fed into the Stage 2 reactor. Feed to Stage 2 flow can be by gravity overflow or by level control on the surge tank with a take-off line and valve from the recirculation pump. ORP is monitored online to ensure the feed ratios are stoichiometric and the pH is measured intermittently with an offline probe.

Stage 2 is run in a second loop reactor with recirculation pump, static mixer, heat exchanger and surge vessel. Hydrazine (35% solution) is charged based on maintaining target ORP and bromine is charged to maintain target pH. The surge vessel is vented to the process scrubber. Alternate embodiments may use a jacketed and agitated reactor for stage 2.

Stage 3 is an agitated vessel with a lime slurry feed to adjust final product pH to specification. Raw product coming from Stage 3 has suspended solid impurities that are filtered with a rotary vacuum drum filter (RVDF) using diatomaceous earth as a pre-coat. The resulting product is a clear solution of calcium bromide. If lower concentration lime slurry is used, an evaporator may be used to concentrate the product to target specification.

Excellent results have also been obtained in preparing NaBr from using a process analogous to the continuous process above and employing a loop reactor in stage 1 and stage 2.

Excellent product purity and starting material utilization is realized by controlling the manner and the conditions under which the various reagents, i.e., bromine and reducing agent, are added to the substrate. The process can be a continuous, semi-continuous or batch process, typically the greatest economic benefit is obtained from using a continuous process.

EXAMPLES

In the following examples, a lime slurry (37.6% solids in water) is prepared offline and charged to a lime slurry tank that is kept agitated to prevent settling.

Example 1: Batch Process for $CaBr_2$

Stage 1—To 870 grams, 11.4 moles, of hydrated lime as a 37.6% aqueous slurry in a stirred reaction vessel is added 408 grams, 6.8 moles, of ammonia as a 28.5% aqueous solution. The reaction vessel is immersed a water bath and 1,635 grams, 10.23 moles, of bromine is added below the surface of the reaction mixture at a rate to keep the reaction temperature below 70° C.

Stage 2—About 85% of the reaction mixture from stage 1 (the remainder is held back to use in pH adjustment of the final reaction product) is transferred at room temperature to a reaction vessel equipped with pH probe and ORP probe. The reaction mixture is stirred and HBr is added to lower pH to 0.60. The amount of $Br_2$ needed to complete conversion of lime to $CaBr_2$ is added below the reaction surface through a feed under pH cascade control (set at ~0.60), and a solution of hydrazine is added manually hydrazine to maintain an ORP value below 600 mV.

Product adjustment stage—Material held back from stage 1 reaction mixture is added to the stage 2 reaction mixture via a pump to obtain a pH of 7.0. The crude product is cooled room temperature and filtered with Celatom FW-80 to yield the final product as a clear solution with a target density of greater than 14.2 lbs/gal, a bromate concentration of less than 50 ppm and an ammonia concentration of less than 1000 ppm.

Example 2—Continuous Process for $CaBr_2$—Loop Plus Agitated Reactor Setup

Stage 1—Into a loop reactor equipped with inline static mixer and heat exchanger with cooling tower water on the shell-side is fed lime slurry, 10.1 kg/h, gaseous ammonia, 1.35 kg/h, and bromine, 19.05 kg/h. The ammonia feed is teed into the lime slurry feed which creates a mixture of lime and aqueous ammonia prior to exposure of the lime to bromine. The reaction is heated by the exotherm from $Br_2/NH_3$ reaction and is allowed to exceed the bp of $Br_2$ due to the increased pressure created at the discharge of the recirculation pump and at the bromine addition point. Liberated nitrogen is vented to a sodium hydroxide process scrubber after passing through the gas-liquid separator.

ORP is monitored online to ensure the feed ratios are stoichiometric. Feed of the reaction mixture to the Stage 2 reactor is controlled by gravity overflow from Stage 1 gas-liquid separator.

Stage 2—The reaction mixture from stage 1 is stirred in a jacketed and agitated reactor cooled by tower water and equipped with a recirculation loop for online pH and ORP measurement. Hydrazine (35% solution) is charged using cascade control to maintain a +640 mV ORP; bromine is charged using cascade control to maintain a pH of −1.8. Nitrogen is liberated and is vented off to the sodium hydroxide scrubber. Flow rate of the feed to the next stage reactor is controlled by a diaphragm pump pulling material from Stage 2 by a dip-tube in the reactor, with the height of the dip-tube setting the level.

Product adjustment stage—The pH of the product is adjusted using either a feed from a lime slurry tank or a feed transferring product from stage 1, measurement of pH is done by a probe on a recirculation loop. The vent and overflow of raw product is identical to Stage 2, the product is passed through a rotary vacuum drum filter (RVDF) using diatomaceous earth as a pre-coat to yield a clear solution of calcium bromide.

Example 3—Continuous Process for $CaBr_2$—Dual Loop Reactor Setup

Stage 1—Run following the procedure of Example 2.

Stage 2—The feed from stage 1 is introduced into a loop reactor equipped with inline static mixer, heat exchanger and the pH and ORP cascade control systems shown schematically in FIG. 1. Hydrazine (35% solution) is charged via cascade control to maintain a +640 mV ORP; bromine is charged via cascade control to maintain a pH of −1.8. Initial feed rates anticipate 1.29 kg/h of lime (from the stage 1 reaction product), 2.41 kg/h bromine and 0.24 kg/h hydrazine. Nitrogen is liberated and is vented off to the sodium hydroxide scrubber. Stage 2 reactor is level controlled to the next stage reactor by gravity or by pumps using typical level control devices.

Product adjustment stage—Run following the procedure of Example 2 to yield a clear solution of calcium bromide.

What is claimed:

1. A loop reactor comprising an inline static mixer, heat exchanger, reagent feeds, a pH cascade control system configured to control a reagent feed rate through at least one reagent feed and an oxidation/reduction potential cascade control system configured to control a reagent feed rate through at least one reagent feed wherein the loop reactor comprises as reagent feeds a bromine feed and a reducing agent feed, and wherein at least one of the pH cascade control system or oxidation/reduction potential cascade control system is configured to control the feed rate of bromine through the bromine feed and/or the feed rate of the reducing agent through the reducing agent feed.

2. The loop reactor according to claim 1, wherein the pH cascade control system is configured to control the feed rate of bromine through the bromine feed, and the oxidation/reduction potential cascade control system is configured to control the feed rate of reducing agent through the reducing agent feed.

3. The loop reactor according to claim 1, wherein the pH cascade control system is configured to control the feed rate of reducing agent through the reducing agent feed and the oxidation/reduction potential cascade control system is configured to control the feed rate of bromine through the bromine feed.

4. The loop reactor according to claim 1, wherein the pH cascade control system is an automated system for controlling a reagent feed rate by continuously measuring pH in the reactor, calculating feed rate adjustments through a continuous feedback loop using measured pH values, a desired pH value, and existing feed rate set points, and then automatically resetting the feed rate; and the oxidation/reduction potential cascade control is an automated system for controlling a reagent feed rate by continuously measuring oxidation/reduction potential in the reactor, calculating feed rate adjustments through a continuous feedback loop using measured oxidation/reduction potential values, a desired oxidation/reduction potential value, and existing feed rate set points, and then automatically resetting the feed rate.

5. The loop reactor according to claim 4, wherein the pH cascade control system is configured to control the feed rate of bromine through the bromine feed, and the oxidation/reduction potential cascade control system is configured to control the feed rate of reducing agent through the reducing agent feed.

6. The loop reactor according to claim 4, wherein the pH cascade control system is configured to control the feed rate of reducing agent through the reducing agent feed and the oxidation/reduction potential cascade control system is configured to control the feed rate of bromine through the bromine feed.

7. A reactor system comprising a first stage reactor and a second stage reactor, wherein the second stage rector comprises the loop reactor according to claim 4, and wherein a reaction mixture prepared in the first stage reactor is fed into the second stage reactor.

8. The reactor system according to claim 7, wherein the first stage reactor comprises an agitated vessel.

9. The reactor system according to claim 7, wherein the first stage reactor comprises a loop reactor comprising an inline static mixer and heat exchanger.

10. The reactor system according to claim 9, wherein the loop reactor of the first stage reactor further comprises a surge vessel.

11. A reactor system comprising a first stage reactor and a second stage reactor, wherein the second stage rector comprises the loop reactor according to claim 5, and wherein a reaction mixture prepared in the first stage reactor is fed into the second stage reactor.

12. The reactor system according to claim 11, wherein the first stage reactor comprises an agitated vessel.

13. The reactor system according to claim 11, wherein the first stage reactor comprises a loop reactor comprising an inline static mixer and heat exchanger.

14. The reactor system according to claim 13, wherein the loop reactor of the first stage reactor further comprises a surge vessel.

* * * * *